US012731874B2

(12) United States Patent
Ke et al.

(10) Patent No.: US 12,731,874 B2
(45) Date of Patent: Sep. 8, 2026

(54) HOUSING, BATTERY CELL, BATTERY AND ELECTRIC APPARATUS

(71) Applicant: CONTEMPORARY AMPEREX TECHNOLOGY (HONG KONG) LIMITED, Hong Kong (CN)

(72) Inventors: Haibo Ke, Ningde (CN); Quankun Li, Ningde (CN); Peng Wang, Ningde (CN); Xiaobo Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 703 days.

(21) Appl. No.: 18/099,225

(22) Filed: Jan. 19, 2023

(65) Prior Publication Data

US 2023/0155262 A1 May 18, 2023

Related U.S. Application Data

(63) Continuation of application No. PCT/CN2021/115772, filed on Aug. 31, 2021.

(51) Int. Cl.
*H01M 50/578* (2021.01)
*H01M 10/04* (2006.01)
(Continued)

(52) U.S. Cl.
CPC ..... *H01M 50/578* (2021.01); *H01M 10/0422* (2013.01); *H01M 50/107* (2021.01); *H01M 50/581* (2021.01); *H01M 2220/20* (2013.01)

(58) Field of Classification Search
CPC .. H01M 50/50; H01M 50/578; H01M 50/107; H01M 50/581
See application file for complete search history.

(56) References Cited

U.S. PATENT DOCUMENTS

2009/0068548 A1* 3/2009 Kaplan ................. H01M 4/661 429/163
2013/0017421 A1 1/2013 Onnerud et al.
(Continued)

FOREIGN PATENT DOCUMENTS

CN 2529389 Y 1/2003
CN 203456515 U 2/2014
(Continued)

OTHER PUBLICATIONS

Machine Translation of: Nemoto et al. (JP 2000-182588 A), Jun. 30, 2000.*

(Continued)

*Primary Examiner* — Kenneth J Douyette
(74) *Attorney, Agent, or Firm* — Ladas & Parry LLP

(57) ABSTRACT

Disclosed are a case, a battery cell, a battery, and an electrical apparatus. The case includes a case body and a pressure relief structure, the case body accommodates an electrode assembly, and the pressure relief structure included a plurality of first pressure relief grooves disposed at intervals on the case body along the circumferential direction of the case body. The case body ruptures along the first pressure relief grooves when the pressure or temperature inside the case body reaches a threshold to release the pressure inside the case body. During a pressure relief process, even if one of the first pressure relief grooves is shielded, the case body can still rupture along other first pressure relief grooves, so as to ensure the normal pressure relief of the case body, reduce the risk of fire and explosion of the battery cell, and improve the safety of the battery cell.

14 Claims, 5 Drawing Sheets

(51) Int. Cl.
*H01M 50/107* (2021.01)
*H01M 50/581* (2021.01)

(56) References Cited

U.S. PATENT DOCUMENTS

2013/0084475 A1* 4/2013 Gu .................... H01M 10/0525 29/623.2
2013/0130100 A1* 5/2013 Kurata ................ H01M 50/536 429/179

FOREIGN PATENT DOCUMENTS

| | | | |
|---|---|---|---|
| CN | 203562463 | U | 4/2014 |
| CN | 210245599 | U | 4/2020 |
| CN | 210576159 | U | 5/2020 |
| CN | 211238301 | U | 8/2020 |
| CN | 215989100 | U | 3/2022 |
| JP | 2000149901 | A | 5/2000 |
| JP | 2000182588 | A | 6/2000 |
| JP | 2005038709 | A | 2/2005 |
| JP | 2013048038 | A | 3/2013 |
| JP | 2021125467 | A | 8/2021 |
| KR | 20180043996 | A | 5/2018 |

OTHER PUBLICATIONS

Extended European search report for EP application No. 21949519.9, dated Jul. 4, 2024.

Jia Yikai et al. "Deformation and fracture behaviors of cylindrical battery shell during thermal runaway" Journal of Power Sources, Elsevier, Amsterdam, NL, vol. 539, May 16, 2022.

Decision to Grant a Patent, JP application No. 2023-501189, dated May 28, 2024.

Request for the Submission of an Opinion, KR application No. 10-2023-7003340, dated Nov. 22, 2024.

International Search Report for Application No. PCT/CN2021/115772, mailed May 12, 2022.

Written Opinion for Application No. PCT/CN2021/115772, mailed May 12, 2022.

Notice of Reasons for Refusal, JP application No. 2023-501189, dated Feb. 27, 2024.

Notification to Grant Patent Right, CN application No. 202122087081.1, dated Jan. 11, 2022.

Notice of Allowance, KR application No. 10-2023-7003340, dated Feb. 20, 2026.

First Office Action of CN application No. 202180091950.8, dated Mar. 24, 2026.

* cited by examiner

HOUSING, BATTERY CELL, BATTERY AND ELECTRIC APPARATUS

CROSS REFERENCE TO RELATED APPLICATION

This application is a continuation of International Patent Application No. PCT/CN2021/115772, filed on Aug. 31, 2021, which is incorporated herein by reference in its entirety.

TECHNICAL FIELD

The present application relates to the technical field of batteries, and specifically, to a case, a battery cell, a battery, and an electrical apparatus.

BACKGROUND

Energy saving and emission reduction being the key to the sustainable development of automobile industry, electric vehicles have become an important part of the sustainable development of automotive industry due to their advantages of energy saving and environmental protection. For electric vehicles, battery technology is an important factor related to their development.

In the development of the battery technologies, in addition to improving the performance of the battery, the safety issue is also a problem that needs to be considered. Therefore, how to improve the safety of the battery cells is an urgent problem to be solved in the battery technologies.

SUMMARY

Embodiments of the present application provides a case, a battery cell, a battery, and an electrical apparatus, which can effectively improve the safety of the battery cell.

In a first aspect, the embodiments of the present application provide a case, comprising: a case body for accommodating an electrode assembly; and a pressure relief structure comprising a plurality of first pressure relief grooves disposed at intervals on the case body along the circumferential direction of the case body; wherein the case body is configured to rupture along the first pressure relief grooves when the pressure or temperature inside the case body reaches a threshold so as to release the pressure inside the case body.

In the technical solution above, the case body being provided with a plurality of first pressure relief grooves arranged at intervals in the circumferential direction, and the case body can be ruptured along the first pressure relief grooves when the internal pressure or temperature thereof reaches a threshold, so as to achieve the purpose of releasing the pressure inside the case body. During a pressure relief process, even if one of the first pressure relief grooves is shielded, the case body can still be ruptured along other first pressure relief grooves, so as to ensure normal pressure relief of the case body, reduce the risk of fire and explosion of the battery cell, and improve the safety of the battery cell.

In some embodiments, the pressure relief structure further includes a second pressure relief groove disposed on the case body, the first pressure relief groove intersects with the second pressure relief grooved to form an opening position, and the case body is configured to rupture along the first pressure relief groove from the opening position when the pressure or temperature inside the case body reaches a threshold.

In the technical solution above, the case body being provided with a second pressure relief groove, the second pressure relief groove intersects with the first pressure relief groove to form an opening position, so that the case body is more likely to be ruptured at the opening position, so that the case body is rapidly ruptured along the first pressure relief groove from the opening position when the pressure or temperature inside the case body reaches a threshold, thereby realizing rapid pressure relief. The case body may also be partially ruptured along the second pressure relief groove after rupturing at the opening position, thereby increasing the pressure relief area of the case body.

In some embodiments, the second pressure relief groove extends along the circumferential direction of the case body, and each first pressure relief groove intersects with the second pressure relief groove to form an opening position.

In the technical solution above, each first pressure relief groove intersects with the second pressure relief groove to form an opening position, that is, a plurality of the first pressure relief grooves intersect with the second pressure relief groove to form opening positions, which is simple in structure and can effectively reduce the production cost.

In some embodiments, the second pressure relief groove is a closed structure extending along the circumferential direction of the case body and connected end-to-end.

In the technical solution above, the second pressure relief groove is a closed structure extending along the circumferential direction of the case body and connected end-to-end, which has a simple structure and is easy to process and form.

In some embodiments, the second pressure relief groove includes a plurality of groove segments disposed at intervals along the circumferential direction of the case body, each groove segment intersects with the first pressure relief groove to form an opening position.

In the technical solution above, the plurality of groove segments being disposed at intervals along the circumferential direction of the case body, and each groove segment intersects with a first pressure relief groove to form an opening position, so that each first pressure relief groove does not interfere with each other during the pressure relief process, and is independent from each other. In addition, since the plurality of groove segments are disposed at intervals along the circumferential direction of the case body, the second pressure relief groove is not continuous, and the strength of the case body is higher, which is beneficial to improve the service life of the case.

In some embodiments, the pressure relief structure further includes third pressure relief grooves and fourth pressure relief grooves, each first pressure relief groove is correspondingly provided with a third pressure relief groove and a fourth pressure relief groove. The third pressure relief groove and the fourth pressure relief groove are disposed at intervals along the extending direction of the first pressure relief groove, and both the third pressure relief groove and the fourth pressure relief groove intersect with the first pressure relief groove, and the first pressure relief groove, the third pressure relief groove and the fourth pressure relief groove together define an opening portion; the opening portion is configured to be opened with the first pressure relief groove, the third pressure relief groove, and the fourth pressure relief groove as boundaries when the pressure or temperature inside the case body reaches a threshold, so as to release the pressure inside the case body.

In the technical solution above, the first pressure relief groove, the third pressure relief groove and the fourth pressure relief groove together define the opening portion, and when the case body is depressurized, the pressure relief structure can be opened with the first pressure relief groove, the third pressure relief groove and the fourth pressure relief groove as boundaries, and has a large pressure relief area, thereby improving the pressure relief rate, and reducing the risk of fire and explosion of the battery cell.

In some embodiments, the first pressure relief groove, the third pressure relief groove and the fourth pressure relief groove together define two opening portions, and the two opening portions are respectively located on both sides of the first pressure relief groove.

In the technical solution above, the first pressure relief groove, the second pressure relief groove and the third pressure relief groove together define two opening portions respectively located on both sides of the first pressure relief groove, and during a pressure relief process, the two opening portions can be opened quickly in a side-by-side manner, thereby improving the pressure relief rate of the case body.

In some embodiments, the first pressure relief groove has an opening position, the third pressure relief groove intersects with the first pressure relief groove to form a first weak position, and the fourth pressure relief groove intersects with the first pressure relief groove to form a second weak position, in the extending direction of the first pressure relief groove, the opening position is located between the first weak position and the second weak position; the case body is configured to rupture at the first pressure relief groove from the opening position to the first weak position and the second weak position and form a crack when the pressure or temperature inside the case body reaches a threshold, so that the open portion is opened along the third pressure relief groove and the fourth pressure relief groove after the crack being formed on the case body.

In the technical solution above, the opening position of the first pressure relief groove is the pressure relief starting position, the case body at the opening position is weaker than that at the first weak position and the second weak position, so the case body is more likely to be ruptured at the opening position. When the internal pressure or temperature of the case body reaches a threshold, the case body first being ruptured along the first pressure relief groove from the opening position towards the first weak position and the second weak position, and then being ruptured along the third pressure relief groove and the fourth pressure relief groove, so that the opening portion is opened along the third pressure relief groove and the fourth pressure relief groove, thereby realizing quick opening of the opening portion.

In some embodiments, the wall thickness of the case body at the first weak position and the wall thickness of the case body at the second weak position are both greater than the wall thickness of the case body at the opening position.

In the technical solution above, the wall thickness of the case body at the first weak position and the wall thickness of the case body at the second weak position being greater than the wall thickness of the case body at the opening position, that is, the wall thickness of the case body at the opening position is thinner, so that the case body at the opening position is weaker than that at the first weak position and the second weak position, so the case body is more likely to be ruptured at the opening position, thereby ensuring that, during a pressure relief process, the opening position splits along the first pressure relief groove from the opening position towards the first weak position and the second weak position.

In some embodiments, the case body is of a cylindrical structure, and the first pressure relief groove extends along the axial direction of the case body.

In the above technical solution, the first pressure relief groove extending along the axial direction of the cylindrical case body, which is beneficial to ensure the length of the first pressure relief groove.

In some embodiments, the pressure relief structure is disposed on the outer surface of the case body.

In the above technical solution, the pressure relief structure being disposed on the outer surface of the case body, which facilitates the processing of each pressure relief groove in the pressure relief structure.

In some embodiments, the case body includes a bottom wall and a peripheral wall, the peripheral wall is arranged around the edge of the bottom wall, and the pressure relief structure is disposed on the peripheral wall.

In the above technical solution, the pressure relief structure being disposed on the peripheral wall of the case body, which can realize pressure relief in multiple directions.

In a second aspect, the embodiments of the present application provide a battery cell, comprising:

an electrode assembly; and a case provided by any one of the embodiments of the first aspect, the case is used for accommodating the electrode assembly.

In a third aspect, the embodiments of the present application provide a battery, comprising: the battery cell provided by any one of the embodiments of the second aspect; and a box body for accommodating the battery cell.

In a fourth aspect, the embodiments of the present application provide an electrical apparatus, including a battery provided by any one of the embodiments of the third aspect.

In a fifth aspect, the embodiments of the present application provide a method for manufacturing a case, the method comprising: providing a case body for accommodating an electrode assembly; processing to obtain a pressure relief structure on the case body to form a plurality of first pressure relief grooves disposed at intervals on the case body along the circumferential direction of the case body; wherein the case body is configured to rupture along the first pressure relief grooves when the pressure or temperature inside the case body reaches a threshold to release the pressure inside the case body.

In a sixth aspect, the embodiments of the present application provide a manufacturing apparatus for a case, the manufacturing apparatus comprising: a providing device for providing a case body, the case body being used for accommodating an electrode assembly; a processing device for processing to obtain a pressure relief structure on the case body, so as to form a plurality of first pressure relief grooves disposed at intervals on the case body along the circumferential direction of the case body; wherein the case body is configured to rupture along the first pressure relief grooves when the pressure or temperature inside the case body reaches a threshold to release the pressure inside the case body.

BRIEF DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

DESCRIPTION OF REFERENCE NUMERALS

Figure 1:
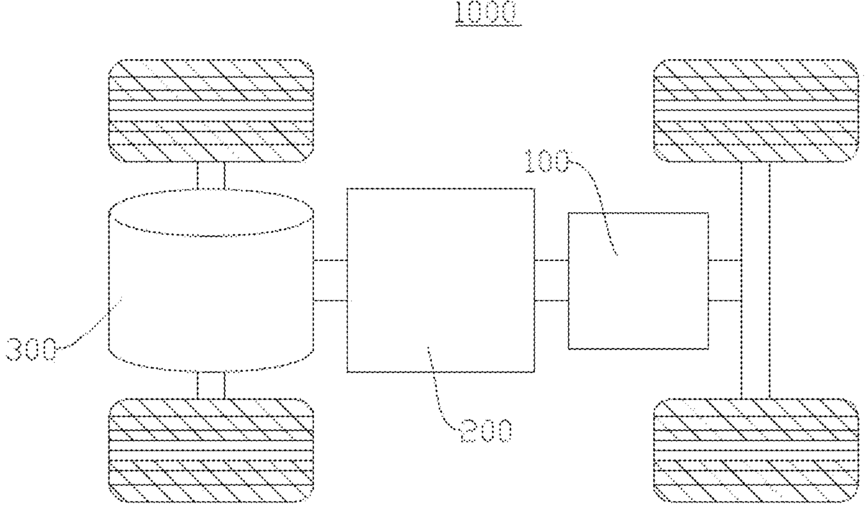
FIG. 1 is a schematic structural view of a vehicle provided by some embodiments of the present application.

10—box body;
11—first portion;
12—second portion;
20—battery cell;
21—case;
211—case body;
212—pressure relief structure;
2121—first pressure relief groove;
2122—second pressure relief groove;
2122*a*—groove segment;
2123—opening position;
2124—third pressure relief groove;
2125—fourth pressure relief groove;
2126—opening portion;
2127—first weak position;
2128—second weak position;
22—electrode assembly;
23—end cap;
231—electrode terminal;
24—current collecting member;
100—battery;
200—controller;
300—motor;
1000—vehicle;
2000—manufacturing apparatus;
2100—providing device;
2200—processing device;
Z—height direction.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. Based on the embodiments in the present application, all other embodiments obtained by those of ordinary skill in the art without creative effort fall within the protection scope of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

Reference in the present application to "embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the embodiments of the present application, the same reference numerals denote the same components, and for the sake of brevity, detailed descriptions of the same components are omitted in different embodiments. It should be understood that the thickness, length, width and other dimensions of various components in the embodiments of the present application shown in the drawings, as well as the overall thickness, length and width, etc. of the integrated device are only exemplary descriptions, and should not constitute any limitation to the present application.

The "plurality" in the present application refers to two or more (including two).

In the present application, battery cells may include a lithium-ion secondary battery, a lithium-ion primary battery, a lithium-sulfur battery, a sodium-lithium-ion battery, a sodium-ion battery, or a magnesium-ion battery, etc., which is not limited in the embodiments of the present application. The battery cell may be cylindrical, flat, rectangular, or in other shapes, which is also not limited in the embodiments of the present application. The battery cells are generally divided into three types according to packaging manners: cylindrical battery cells, square battery cells, and pouch cells, which are not limited in the embodiments of the present application.

The battery mentioned in the embodiments of the present application refers to a single physical module including one or more battery cells to provide a higher voltage and capacity. For example, the battery mentioned in the present application may include a battery module, a battery pack, or the like. The battery typically includes a box body for encapsulating one or more battery cells. The box body can prevent liquids or other foreign matters from affecting charging or discharging of the battery cells.

The battery cells include electrode assemblies and electrolyte solutions, and each electrode assembly is composed of a positive electrode sheet, a negative electrode sheet and a separator. The battery cells work mainly relying on the movement of metal ions between the positive electrode sheet and the negative electrode sheet. The positive electrode sheet includes a positive current collector and a positive electrode active material layer, a surface of the positive current collector is coated with the positive electrode active material layer, the positive current collector not coated with the positive electrode active material layer protrudes from the positive electrode collector already coated with the positive electrode active material layer, and the positive current collector not coated with the positive electrode active material layer is used as a positive electrode tab. Taking a lithium-ion battery as an example, the material of the positive current collector may be aluminum, and the positive active material may be lithium cobalt oxide, lithium iron phosphate, ternary lithium, lithium manganate, or the like. The negative electrode sheet includes a negative current collector and a negative electrode active material layer, a surface of the negative current collector is coated with the negative electrode active material layer, the negative current collector not coated with the negative electrode active material layer protrudes from the negative electrode collector already coated with the negative electrode active material layer, and the negative current collector not coated with the negative electrode active material layer is used as a negative electrode tab. The material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A diaphragm may be made from polypropylene (PP), polyethylene (PE), or the like. In addition, the electrode assembly may be of a wound structure or a laminated structure, which is not limited in the embodiments of the present application.

Many design factors, such as energy density, cycle life, discharge capacity, charge-discharge rate and other performance parameters, should be considered in the development of the battery technology. In addition, the safety of the battery also needs to be taken into account.

In a battery cell, in order to ensure the safety of the battery cell, it is generally necessary to provide a pressure relief structure on the case, and the pressure inside the battery cell is released by means of the pressure relief structure to ensure the safety of the battery cell.

The inventors found that even if a pressure relief structure is provided on the case, the battery cells may still have the risk of fire and explosion. After further research by the inventor, at present, a pressure relief groove is generally deposed on the case, and the pressure relief is realized by rupture of the case at the position of pressure relief groove. The pressure relief position of the case is likely to be shielded by other battery cells, and the position of the case in the pressure relief groove cannot be opened, which results in that the internal emissions cannot be discharged smoothly when the battery cells being in thermal runaway, which is likely to cause the risk of explosion and fire, and the safety is poor.

In view of this, the embodiments of the present application provide a case, a plurality of first pressure relief grooves are disposed at intervals on the case body along the circumferential direction of the case body, and the case body is configured to rupture along the first pressure relief groove when the pressure or temperature inside the case body reaches a threshold to release the pressure inside the case body.

In such a case, the case body being provided with a plurality of first pressure relief grooves disposed at intervals in the circumferential direction, and during a pressure relief process, even if one of the first pressure relief grooves is shielded, the case body may still be ruptured along other first pressure relief grooves, so as to ensure the normal pressure relief of the case body, reduce the risk of fire and explosion of the battery cell, and improve the safety of battery cells.

The case described in the embodiments of the present application are suitable for battery cells, batteries, and electrical apparatus using batteries.

The electrical apparatus may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended-range vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The embodiments of the present application do not impose special limitations on the above powered apparatus.

For convenience of explanation, the following embodiments are described by taking an electric apparatus is a vehicle as an example.

Please refer to FIG. 1, which is a schematic structural view of a vehicle 1000 provided by some embodiments of the present application, the interior of the vehicle 1000 is provided with a battery 100, and the battery 100 may be provided at the bottom or head or rear of the vehicle 1000. The battery 100 can be used to power the vehicle 1000, for example, the battery 100 can serve as an operating power source for the vehicle 1000.

The vehicle 1000 may further include a controller 200 and a motor 300, wherein the controller 200 is used to control the battery 100 to power the motor 300, for example, for the operating power demand when the vehicle 1000 is starting, navigating and driving.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
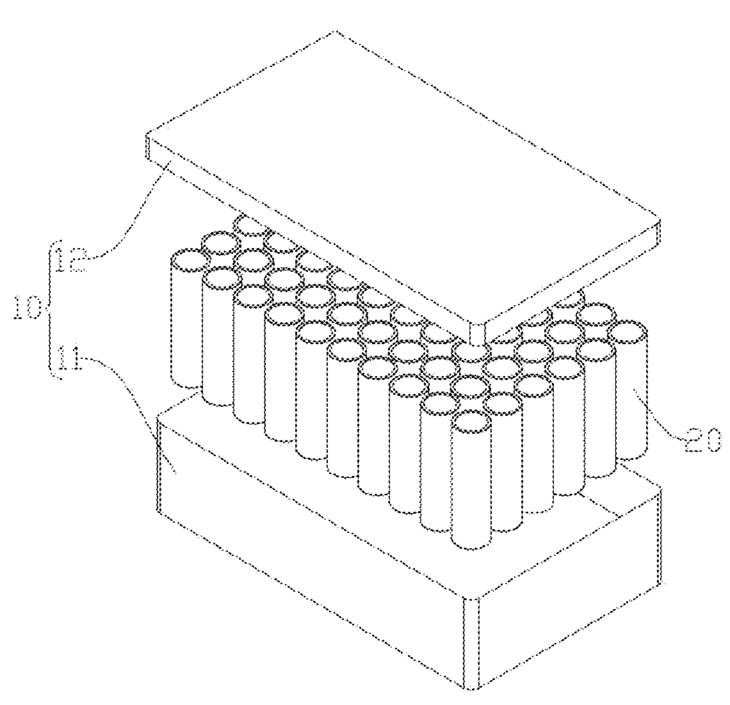
FIG. 2 is a schematic structural view of a battery provided by some embodiments of the present application.

Please refer to FIG. 2, which is a schematic structural diagram of a battery 100 according to some embodiments of the present application, where the battery 100 includes a box body 10 and a battery cell 20, and the box body 10 is used for accommodating the battery cell 20.

The box body 10 is a component for accommodating the battery cell 20, the box body 10 provides an accommodating space for the battery cell 20, and the box body 10 can be of various structures. In some embodiments, the box body 10 may include a first portion 11 and a second portion 12, the first portion 11 and the second portion 12 being covered to each other to define an accommodating space for accommodating the battery cell 20. The first portion 11 and the second portion 12 may be of a variety of shapes, such as a rectangular parallelepiped, a cylinder, or the like. The first portion 11 may be a hollow structure with one side open, the second portion 12 may also be a hollow structure with one side open, and the opening side of the second portion 12 covers the opening side of the first portion 11, so as to form a box body 10 with an accommodating space. Alternatively, the first portion 11 may be a hollow structure with one side open, the second portion 12 may be a plate-like structure, and the second portion 12 covers the opening side of the first portion 11 to form a box body 10 with an accommodating space. The first portion 11 and the second portion 12 may be sealed by a sealing member, which may be a sealing ring, a sealant, or the like.

There may be one or more battery cell 20 in a battery 100. If there are a plurality of battery cells 20, the plurality of battery cells 20 can be connected in series or parallel or in a mixed connection, wherein the mixed connection means that the plurality of battery cells 20 are connected in both series and parallel. The plurality of battery cells 20 may be connected in series or in parallel or in mixed connection to form a battery module first, then a plurality of battery modules are connected in series or in parallel or in mixed connection to form a whole, and accommodated in the box body 10. It may also be that all the battery cells 20 are directly connected in series or in parallel or in mixed connection, and then the whole composed of all the battery cells 20 is accommodated in the box body 10.

In some embodiments, the battery 100 may also include a confluence component, and a plurality of battery cells 20 may be electrically connected through the confluence component, so as to realize series, parallel or mixed connection of the plurality of battery cells 20. The confluence component may be metal conductors such as copper, iron, aluminum, stainless steel, aluminum alloys, and the like.

Figure 3:
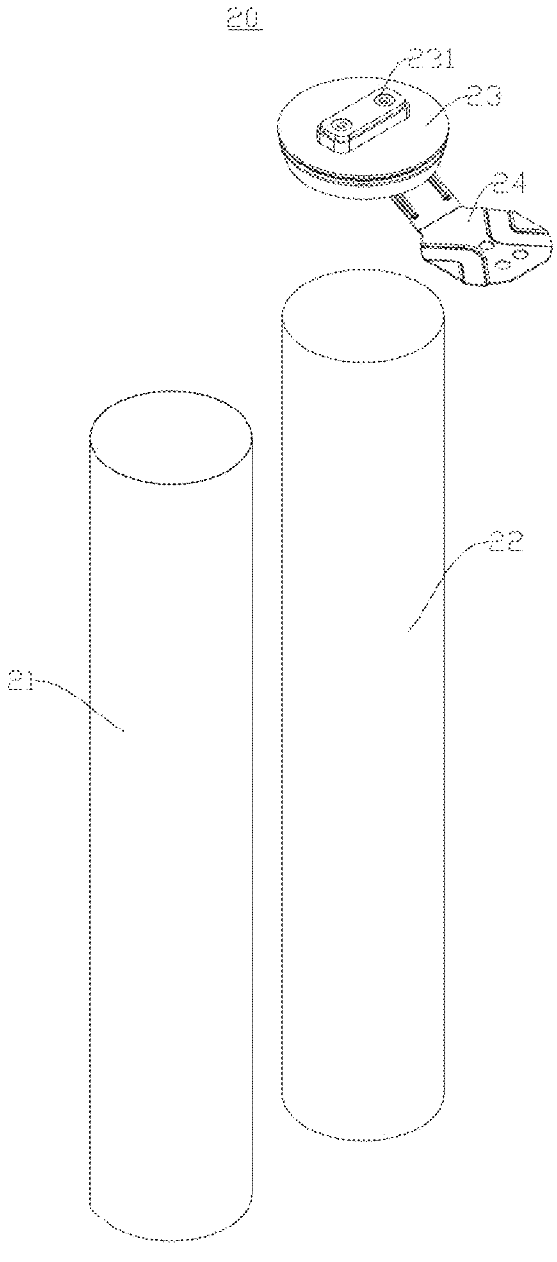
FIG. 3 is an exploded view of a battery cell provided by some embodiments of the present application.

Please refer to FIG. 3, which is an exploded view of a battery cell 20 provided by some embodiments of the present application. The battery cell 20 includes a case 21, an electrode assembly 22 and an end cap 23, the electrode assembly 22 is accommodated in the case 21, the end cap 23 is used for covering the opening of the case 21.

The case 21 is a component for accommodating the electrode assembly 22, and the case 21 may be a hollow structure with an opening formed at one end, and the case 21 may also be a hollow structure with openings formed at opposite ends. If the case 21 being a hollow structure with an opening formed at one end, then, one end cap 23 may be provided; if the case 21 being a hollow structure with openings formed at two opposite ends, then, two end caps 23 may be provided, and the two end caps 23 cover the openings at both ends of the case 21 respectively. The case 21 may be made of various materials, such as copper, iron, aluminum, stainless steel, aluminum alloy, or the like. The case 21 may be of a variety of shapes, such as a cylinder, a rectangular parallelepiped, or the like. Exemplarily, in FIG. 3, the case 21 is a cylindrical structure, and the case 21 is a hollow structure with an opening formed at one end.

The electrode assembly 22 is a component in which an electrochemical reaction occurs in the battery cell 20. The electrode assembly 22 may be a cylinder, a rectangular parallelepiped, or the like, and if the electrode assembly 22 is a cylindrical structure, the case 21 may also be a cylindrical structure, and if the electrode assembly 22 is a rectangular parallelepiped structure, the case 21 may also be a rectangular parallelepiped structure. The electrode assembly 22 may comprise a positive electrode sheet, a negative electrode sheet and a separator. The electrode assembly 22 may be a wound-type structure formed by winding a positive electrode sheet, a separator and a negative electrode sheet, or may be a stacked-type structure formed by stacking a positive electrode sheet, a separator, and a negative electrode sheet.

The positive electrode sheet may include a positive electrode current collector and a positive electrode active material layer coated on opposite sides of the positive electrode current collector. The negative electrode sheet may include a negative electrode current collector and a negative electrode active material layer coated on opposite sides of the negative electrode current collector. The electrode assembly 22 has a positive electrode tab and a negative electrode tab, the positive electrode tab may be a portion of the positive electrode sheet on which the positive electrode active material layer is not coated, and the negative electrode tab may be a portion of the negative electrode sheet on which the negative electrode active material layer is not coated.

The end cap 23 is a component that covers the opening of the case 21 to isolate the internal environment of the battery cell 20 from the external environment. The shape of the end cap 23 may be adapted to the shape of the case 21, for example, the case 21 is of a rectangular parallelepiped structure, and the end cap 23 is of a rectangular plate-like structure adapted to the case 21; for another example, as shown in FIG. 3, the case 21 is of a cylindrical structure, and the end cap 23 is of a circular plate-like structure adapted to the case 21. The material of the end cap 23 can also be various, for example, copper, iron, aluminum, steel, aluminum alloy, or the like, and the material of the end cap 23 and the material of the case 21 may be the same or different.

Electrode terminals 231 may be disposed on the end cap 23, and the electrode terminals 231 are used for electrical connection with the positive electrode tab or the negative electrode tab of the electrode assembly 22.

In some embodiments, the battery cell 20 may further include a current collecting member 24, and the electrode terminals 231 are electrically connected with the positive electrode tab or the negative electrode tab of the electrode assembly 22 through the current collecting member 24.

The number of the current collecting member 24 of the battery cell 20 may be one or two. For example, the case 21 is a hollow structure with an opening formed at one end, the end cap 23 covers the opening of the case 21, one of the positive electrode tab and the negative electrode tab is electrically connected to an electrode terminal 231 through a current collecting member 24, and the other is electrically connected to the case 21; for another example, the case 21 is a hollow structure in which openings are formed at opposite ends, two end caps 23 cover the openings of the case 21, one of the positive electrode tab and the negative electrode tab is electrically connected to an electrode terminal 231 on one end cap 23 through a current collecting member 24, and the other is electrically connected to an electrode terminal 231 on the other end cap 23 through another current collecting member 24.

Figure 4:
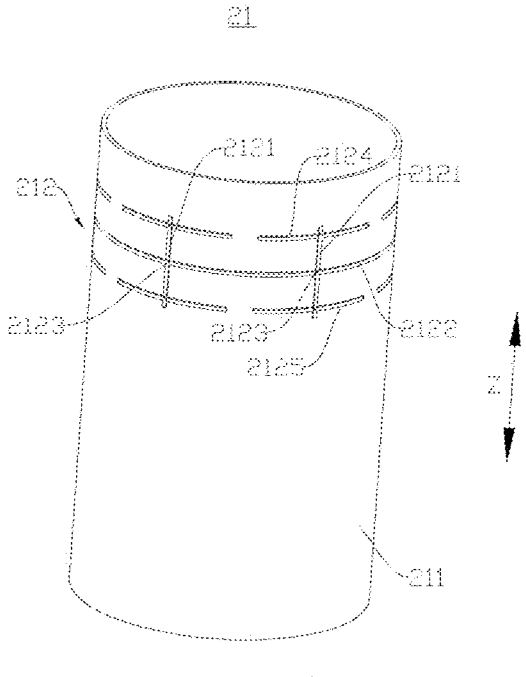
FIG. 4 is a schematic structural view of a case provided by some embodiments of the present application.

Please refer to FIG. 4, which is a schematic structural view of a case 21 provided by some embodiments of the present application. The case 21 includes a case body 211 and a pressure relief structure 212, the case body 211 is used for accommodating the electrode assembly 22, and the pressure relief structure 212 includes a plurality of first pressure relief grooves 2121 disposed at intervals on the case body 211 along the circumferential direction of the case body 211. The case body 211 is configured to rupture along the first pressure relief groove 2121 when the pressure or temperature inside the case body 211 reaches a threshold, so as to release the pressure inside the case body 211.

The case body 211 is a component for accommodating the electrode assembly 22, and the case body 211 may be of a variety of shapes, such as a rectangular parallelepiped, a cylinder, and the like. The circumferential direction of the case body 211 refers to the direction around the center line of the case body 211, and the center line extends along the height direction Z of the case body 211. Taking the case body 211 is a cylinder as an example, the circumferential direction of the case body 211 refers to the direction around the axis of the case body 211, which is perpendicular to the axis of the case body 211, and also perpendicular to the radial direction of the case body 211. Taking the case body 211 is a rectangular parallelepiped as an example, the case body 211 has four side walls parallel to its length direction and are connected end-to-end, and if a plurality of first pressure relief grooves 2121 are distributed at intervals along the four side walls, it is also belongs to the case where a plurality of pressure relief grooves are disposed at intervals along the circumferential direction of the case body 211, for example, at least two of the four side walls of the case body 211 are provided with the first pressure relief grooves 2121.

The pressure relief structure 212 may be disposed on the outer surface of the case body 211, or may be disposed on the inner surface of the case body 211. If the pressure relief structure 212 is disposed on the outer surface of the case body 211, the first pressure relief grooves 2121 are disposed on the outer surface of the case body 211, and if the pressure relief structure 212 is disposed on the inner surface of the case body 211, the first pressure relief grooves 2121 are disposed on the inner surface of the case body 211.

The wall thickness of the case body 211 in the position where the first pressure relief groove 2121 is provided is smaller, and is more likely to be ruptured, so that when the pressure or temperature inside the case body 211 reaches a threshold, it ruptures along the first pressure relief grooves 2121, so that emissions (gas, electrolyte, etc.) inside the case body 21 can be discharged, so as to release the pressure inside the case body 211. For the battery cell 20, the pressure inside the case body 211 is the pressure inside the battery cell 20.

The first pressure relief groove 2121 can be formed in various ways, such as stamping, milling, rolling, and the like. The extending direction of the first pressure relief groove 2121 may be consistent with the height direction Z of the case body 211, or may form a certain angle with the height direction Z of the case body 211, for example, the extending direction of the first pressure relief groove 2121 is perpendicular to the height direction Z of the case body 211. Taking the case body 211 is a cylinder as an example, the first pressure relief groove 2121 may extend along the axial direction (the height direction Z) of the case body 211, and may extend along the circumferential direction of the case body 211.

In the case 21, the case body 211 is provided with a plurality of first pressure relief grooves 2121 disposed at intervals in the circumferential direction, and the case body 211 can be ruptured along the first pressure relief grooves 2121 when the internal pressure or temperature thereof reaches a threshold, thereby achieving the purpose of releasing the pressure inside the case body 211. During a pressure relief process, even if one of the first pressure relief grooves 2121 is shielded (for example, in the case where the battery 100 includes a plurality of battery cells 20, the plurality of battery cells 20 are arranged side by side, a first pressure relief groove 2121 of a case 21 of a battery cell 20 may be shielded by a case 21 of another battery cell 20), the case body 211 may still be ruptured along other first pressure relief grooves 2121, so as to ensure normal pressure relief of the case body 211, reduce the risk of fire and explosion of the battery cells 20, and improve the safety of the battery cells 20.

In some embodiments, the pressure relief structure 212 further includes a second pressure relief groove 2122 disposed on the case body 211, the first pressure relief groove 2121 intersects with the second pressure relief groove 2122 to form opening position 2123, and the case body 211 is configured to rupture from the opening position 2123 along the first pressure relief groove 2121 when the pressure or temperature inside the case body 211 reaches a threshold.

The first pressure relief groove 2121 intersects with the second pressure relief groove 2122 to form an opening position 2123, and the position where the first pressure relief groove 2121 intersects with the second pressure relief groove 2122 is the opening position 2123. The opening position 2123 is a weaker position of the case body 211 in the region of the first pressure relief groove 2121. The case body 211 first ruptures from the opening position 2123 during pressure relief, and then ruptures along the first pressure relief groove 2121. In the extending direction of the first pressure relief groove 2121, the opening position 2123 may be located at the midpoint position of the first pressure relief groove 2121, or may be offset from the midpoint position of the first pressure relief groove 2121.

The second pressure relief groove 2122 may be formed in a variety of ways, such as stamping, milling, rolling, and the like. After the first pressure relief groove 2121 and the second pressure relief groove 2122 being processed on the case body 211, the opening position 2123 is formed at the intersection position of the first pressure relief groove 2121 and the second pressure relief groove 2122.

In this embodiment, the case body 211 is provided with a second pressure relief groove 2122, and the second pressure relief groove 2122 intersects with the first pressure relief groove 2121 to form an opening position 2123, so that the case body 211 is more likely to be ruptured at the opening position 2123, so that when the pressure or temperature inside the case body 211 reaches a threshold, the case body 211 ruptures rapidly from the opening position 2123 along the first pressure relief groove 2121, thereby realizing rapid pressure relief. The case body 211 can also rupture along the second pressure relief groove 2122 after being ruptured at the opening position 2123, thereby increasing the pressure relief area of the case body 211.

In some embodiments, the second pressure relief groove 2122 extends along the circumferential direction of the case body 211, each first pressure relief groove 2121 intersects with the second pressure relief groove 2122 to form an opening position 2123.

The second pressure relief groove 2122 extends along the circumferential direction of the case body 211, that is to say, the extending direction of the second pressure relief groove 2122 is consistent with the arrangement direction of the plurality of first pressure relief grooves 2121. Since the second pressure relief groove 2122 intersects with the first pressure relief groove 2121, the second pressure relief groove 2122 does not overlap with the first pressure relief groove 2121, the second pressure relief groove 2122 and the first pressure relief groove 2121 are arranged at an angle, and the first pressure relief groove 2121 may extend along the height direction Z of the case body 211.

Each of the first pressure relief grooves 2121 intersects with the second pressure relief groove 2122 to form an opening position 2123, that is to say, all of the plurality of first pressure relief grooves 2121 intersect with the second pressure relief groove 2122 to form opening positions 2123, which is simple in structure and can effectively reduce the production cost.

In some embodiments, the second pressure relief groove 2122 is a closed structure extending along the circumference of the case body 211 and being connected end-to-end.

The second pressure relief groove 2122 extending along the circumferential direction of the case body 211 and being connected end-to-end, i.e., the second pressure relief groove 2122 is arranged as a whole ring along the circumferential direction of the case body 211, so as to ensure intersecting with a plurality of the first pressure relief grooves 2121. In an embodiment in which the case body 211 being a cylinder, the second pressure relief groove 2122 is an annular structure extending along the circumferential direction of the case body 211 and being connected end-to-end; in an embodiment in which the case body 211 being a rectangular parallelepiped, the second pressure relief groove 2122 is a rectangular structure extending along the circumferential direction of the case body 211 and being connected end-to-end.

In this embodiment, the second pressure relief groove 2122 is a closed structure extending along the circumferential direction of the case body 211 and being connected end-to-end, which has a simple structure and is easy to process and form.

Figure 5:
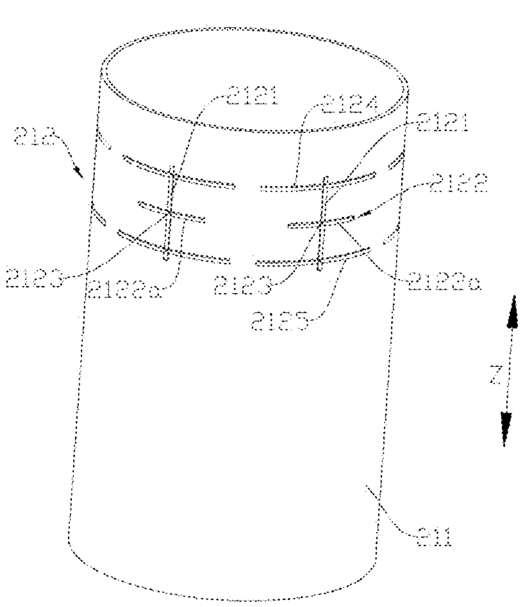
FIG. 5 is a schematic structural view of a case provided by other embodiments of the present application.

In some embodiments, please refer to FIG. 5, which is a schematic structural view of the case 21 provided by other embodiments of the present application, the second pressure relief groove 2122 includes a plurality of groove segments **2122*a* disposed at intervals along the circumferential direction of the case body 211, each groove segment 2122*a* intersects with a first pressure relief groove 2121 to form an opening position 2123**.

The second pressure relief groove 2122 includes a plurality of groove segments **2122*a* disposed at intervals along the circumferential direction of the case body 211, that is, the second pressure relief groove 2122 is divided into a plurality of groove segments 2122*a* disposed along the circumferential direction of the case body 211. In the circumferential direction of the case body 211, two adjacent groove segments 2122*a* are disposed at intervals, that is, two adjacent groove segments 2122*a* are not continuous. Among a plurality of groove segments 2122*a*, each groove segment 2122*a* is used to intersect with a first pressure relief groove 2121 to form an opening position 2123 at the intersection position of the two. It should be understood that each first pressure relief groove 2121 is correspondingly forms an opening position 2123. Of course, the opening position 2123 may be located at the midpoint position of the first pressure relief groove 2121, and may also be located at the midpoint position of the groove segment 2122*a*, so that the first pressure relief groove 2121 and the groove segment 2122*a*** form an approximately "+" shaped structure.

In this embodiment, since the plurality of groove segments **2122*a* are disposed at intervals along the circumferential direction of the case body 211, and each groove segment 2122*a* intersects with a first pressure relief groove 2121 to form an opening position 2123, so that each first pressure relief groove 2121 does not interfere with each other during pressure relief, and is independent from each other. In addition, since the plurality of groove segments 2122*a* are disposed at intervals along the circumferential direction of the case body 211, so that the second pressure relief groove 2122 is not continuous, and the strength of the case body 211 is higher, which is beneficial to increase the service life of the case 21**.

Figures 6, 7:
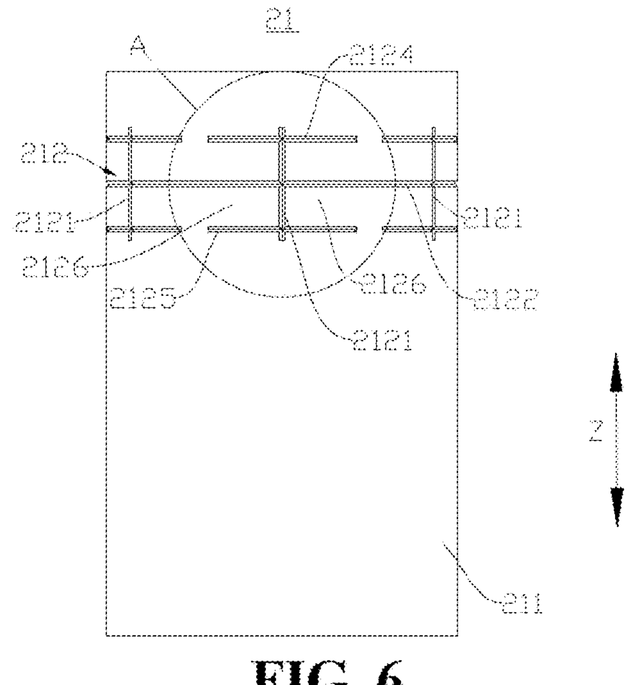
FIG. 6 is a front view of the case shown in FIG. 4.
FIG. 7 is a partial enlarged view at position A of the case shown in FIG. 6.

In some embodiments, please refer to FIG. 6, which is a front view of the case 21 shown in FIG. 4, the pressure relief structure 212 may further includes third pressure relief grooves 2124 and fourth pressure relief grooves 2125, each first pressure relief groove 2121 is correspondingly provided with a third pressure relief groove 2124 and a fourth pressure relief groove 2125, the third pressure relief groove 2124 and the fourth pressure relief groove 2125 are disposed at intervals along the extending direction of the first pressure relief groove 2121, both of the third pressure relief groove 2124 and the fourth pressure relief groove 2125 intersect with the first pressure relief groove 2121, the first pressure relief groove 2121, the third pressure relief groove 2124 and the fourth pressure relief groove 2125 together define an opening portion 2126. The opening portion 2126 is configured to be opened with the first pressure relief groove 2121, the third pressure relief groove 2124, and the fourth pressure relief groove 2125 as boundaries when the pressure or temperature inside the case body 211 reaches a threshold, so as to release the pressure inside the case body 211.

The opening portion 2126 is a region of the case body 211 that is defined by the first pressure relief groove 2121, the third pressure relief groove 2124 and the fourth pressure relief groove 2125 together. Three side portions of the opening portion 2126 that are sequentially connected are respectively located at positions corresponding to the third pressure relief groove 2124, the first pressure relief groove 2121 and the fourth pressure relief groove 2125.

The opening portion 2126 is configured to be opened with the first pressure relief groove 2121, the third pressure relief groove 2124 and the fourth pressure relief groove 2125 as boundaries when the pressure or temperature inside the case body 211 reaches a threshold, that is, when the internal pressure or temperature inside the case body 211 reaches a threshold, the case body 211 will eventually rupture at the positions of the first pressure relief groove 2121, the third pressure relief groove 2124 and the fourth pressure relief groove 2125 to open the opening portion 2126. During the opening of the opening portion 2126, after the case body 211 being ruptured at the position of the first pressure relief groove 2121 and forming a crack, the case body 211 ruptures along the third pressure relief groove 2124 and the fourth pressure relief groove 2125, so that the opening portion 2126 is turned outward and opened. After the opening portion 2126 is opened, an open part is formed at the position of the case body 211 corresponding to the opening portion 2126, and emissions inside the case body 211 can be discharged through the open part, so as to release the pressure inside the case body 211.

When the pressure or temperature inside the case body 211 reaches a threshold, the opening portion 2126 is opened with the first pressure relief groove 2121, the third pressure relief groove 2124 and the fourth pressure relief groove 2125 as the boundaries. After the opening portion 2126 being opened, the case body 211 may be completely split or only partially split at the position of the third pressure relief groove 2124, and the case body 211 may be completely split or only partially split at the position of the fourth pressure relief groove 2125. Of course, if the case body 211 is completely split at both of the position of the third pressure relief groove 2124 and the position of the fourth pressure relief groove 2125, then the opening portion 2126 is completely opened, and the pressure relief area is larger.

The third pressure relief groove 2124 and the fourth pressure relief groove 2125 may also be formed in various ways, such as stamping, milling, rolling, and the like.

The number of the opening portion 2126 defined by the first pressure relief groove 2121, the third pressure relief groove 2124 and the fourth pressure relief groove 2125 together may be one or two. In the embodiment in which one opening portion 2126 is defined by the first pressure relief groove 2121, the third pressure relief groove 2124 and the fourth pressure relief groove 2125 together, the first pressure relief groove 2121 may be disposed at one end of the third pressure relief groove 2124 and the fourth pressure relief groove 2125, so that the first pressure relief groove 2121, the third pressure relief groove 2124, and the fourth pressure relief groove 2125 form an approximate "right open box" shaped structure. In the embodiment in which two opening portions 2126 are defined by the first pressure relief groove 2121, the third pressure relief groove 2124 and the fourth pressure relief groove 2125 together, the first pressure relief groove 2121 may be disposed at the midpoint position of the third pressure relief groove 2124 and the fourth pressure relief groove 2125, so that the first pressure relief groove 2121, the third pressure relief groove 2124 and the fourth pressure relief groove 2125 form an approximate "H" shaped structure.

In this embodiment, the first pressure relief groove 2121, the third pressure relief groove 2124, and the fourth pressure relief groove 2125 together define the opening portion 2126, and when the case body 211 is depressurized, the pressure relief structure 212 can be opened with the first pressure relief groove 2121, the third pressure relief groove 2124, and the fourth pressure relief groove 2125 as boundaries, which has a large pressure relief area, thereby improving the pressure relief rate, and reducing the risk of fire and explosion of the battery cells 20.

In some embodiments, please continue to refer to FIG. 6, the first pressure relief groove 2121, the third pressure relief groove 2124 and the fourth pressure relief groove 2125 together define two opening portions 2126, and the two opening portions 2126 are located at both sides of the first pressure relief groove 2121 respectively.

The first pressure relief groove 2121, the third pressure relief groove 2124 and the fourth pressure relief groove 2125 together define two opening portions 2126. The first pressure relief groove 2121, the third pressure relief groove 2124 and the fourth pressure relief groove 2125 may form an approximately "H" shaped structure. The two opening portions 2126 are located on both sides of the first pressure relief groove 2121 respectively, so that the two opening portions 2126 are bounded by the first pressure relief groove 2121, and after the case body 211 ruptures at the position of the first pressure relief groove 2121, the two opening portions 2126 will be opened in a side-by-side manner to release the pressure inside the case body 211. The two opening portions 2126 may be symmetrically distributed on both sides of the first pressure relief groove 2121.

Since the first pressure relief groove 2121, the second pressure relief groove 2122 and the third pressure relief groove 2124 together define two opening portions 2126 respectively located at both sides of the first pressure relief groove 2121, during a pressure relief process, the two opening portions 2126 can be opened quickly in a side-by-side manner, thereby improving the pressure relief rate of the case body 211.

In some embodiments, please refer to FIG. 7, which is a partial enlarged view at position A of the case 21 shown in FIG. 6, the first pressure relief groove 2121 has an opening position 2123, the third pressure relief groove 2124 intersects with the first pressure relief groove 2121 to form a first weak position 2127, the fourth pressure relief groove 2125 intersects with the first pressure relief groove 2121 to form a second weak position 2128, and in the extending direction of the first pressure relief groove 2121, the opening position 2123 is located between the first weak position 2127 and the second weak position 2128. The case body 211 is configured to rupture at the first pressure relief groove 2121 from the opening position 2123 towards the first weak position 2127 and the second weak position 2128 and form a crack when the pressure or temperature inside the case body 211 reaches a threshold, so that the open portion 2126 is opened along the third pressure relief groove 2124 and the fourth pressure relief groove 2125 after the case body 211 forms the crack.

The case body 211 is configured to rupture at the first pressure relief groove 2121 from the opening position 2123 towards the first weak position 2127 and the second weak position 2128 and form a crack when the pressure or temperature inside the case body 211 reaches a threshold, it should be understood that the opening position 2123 is weaker than the first weak position 2127 and the second weak position 2128, and the case body 211 is more likely to be ruptured at the opening position 2123 than the first weak position 2127 and the second weak position 2128. During the rupture of the case body 211 at the position of the first pressure relief groove 2121, the case body 211 first ruptures at the opening position 2123, and then ruptures along the first pressure relief groove 2121 towards the first weak position 2127 and the second weak position 2128 to form a crack at the position of the first pressure relief groove 2121. The opening position 2123 is the position where the case body 211 first ruptures at the first pressure relief groove 2121, the first weak position 2127 is the position where the case body 211 first ruptures at the third pressure relief groove 2124, and the second weak position 2128 is the position where the case body 211 first ruptures at the fourth pressure relief groove 2125.

The third pressure relief groove 2124 intersects with the first pressure relief groove 2121 to form the first weak position 2127, that is, the position where the third pressure relief groove 2124 intersects with the first pressure relief groove 2121 forms the first weak position 2127. The fourth pressure relief groove 2125 intersects with the first pressure relief groove 2121 to form the second weak position 2128, that is, the position where the fourth pressure relief groove 2125 intersects with the first pressure relief groove 2121 forms the second weak position 2128.

The distance between the opening position 2123 and the first weak position 2127 may be equal to the distance between the opening position 2123 and the second weak position 2128, so that after the case body 211 being ruptured at the opening position 2123, the case body 211 can be ruptured almost simultaneously at the first weak position 2127 and the second weak position 2128, so that during the opening of the opening portion 2126, the case body 211 ruptures synchronously at the positions of the third pressure relief groove 2124 and the fourth pressure relief groove 2125.

The opening position 2123 can be formed in various ways. For example, the first pressure relief groove 2121 is a gradually-changed groove with a gradually changed depth, the depth of the first pressure relief groove 2121 gradually decreases from the opening position 2123 to both ends, and the opening position 2123 is formed at the deepest position of the first pressure relief groove 2121. For another example, as shown in FIG. 7, in an embodiment where the pressure relief structure 212 further includes a second pressure relief groove 2122 disposed on the case body 211, the first pressure relief groove 2121 intersects with the second pressure relief groove 2122 to form an opening position 2123.

The opening position 2123 of the first pressure relief groove 2121 is the pressure relief starting position of the case body 211, and the case body 211 is weaker at the opening position 2123 than at the first weak position 2127 and the second weak position 2128, and the case body 211 is more likely to be ruptured at the opening position 2123. When the internal pressure or temperature of the case body 211 reaches a threshold, the case body 211 first ruptures along the first pressure relief groove 2121 from the opening position 2123 towards the first weak position 2127 and the second weak position 2128, and then ruptures along the third pressure relief groove 2124 and the fourth pressure relief groove 2125, so that the opening portion 2126 is opened along the third pressure relief groove 2124 and the fourth pressure relief groove 2125, thereby realizing quick opening of the opening portion 2126.

In some embodiments, the wall thickness of the case body 211 at the first weak position 2127 and the wall thickness of the case body 211 at the second weak position 2128 are both greater than the wall thickness of the case body 211 at the opening position 2123.

Taking the intersection of the third pressure relief groove 2124 and the first pressure relief groove 2121 forms the first weak position 2127, the intersection of the fourth pressure relief groove 2125 and the first pressure relief groove 2121 forms the second weak position 2128, and the intersection of the second pressure relief groove 2122 and the first pressure relief groove 2121 forms the opening position 2123 as an example, the wall thickness of the case body 211 at the first weak position 2127 refers to the thickness of the remaining part at the first weak position 2127 after the third pressure relief groove 2124 and the first pressure relief groove 2121 are disposed on the case body 211, the wall thickness of the case body 211 at the second weak position 2128 refers to the thickness of the remaining part at the second weak position 2128 after the fourth pressure relief groove 2125 and the first pressure relief groove 2121 are disposed on the case body 211, and the wall thickness of the case body 211 at the opening position 2123 refers to the thickness of the remaining part at the opening position 2123 after the second pressure relief groove 2122 and the first pressure relief groove 2121 are disposed on the case body 211.

By making the depth of the second pressure relief groove 2122 greater than the depth of the first pressure relief groove 2121, the depth of the third pressure relief groove 2124 and the depth of the fourth pressure relief groove 2125, the wall thickness of the case body 211 at the first weak position 2127 and the wall thickness of the case body 211 at the second weak position 2128 are both greater than the wall thickness of the case body 211 at the opening position 2123 can be realized. By making the depth of the second pressure relief groove 2122 equal to the depth of the first pressure relief groove 2121, and the depth of the second pressure relief groove 2122 greater than the depth of the third pressure relief groove 2124 and the fourth pressure relief groove 2125, the wall thickness of the case body 211 at the first weak position 2127 and the wall thickness of the case body 211 at the second weak position 2128 are both greater than the wall thickness of the case body 211 at the opening position 2123 may also be realized Exemplarily, all of the first pressure relief groove 2121, the second pressure relief groove 2122, the third pressure relief groove 2124 and the fourth pressure relief groove 2125 may be of V-shaped grooves with a V-shaped cross section.

Since the wall thickness of the case body 211 at the first weak position 2127 and the wall thickness of the case body 211 at the second weak position 2128 are greater than the wall thickness of the case body 211 at the opening position 2123, i.e. the wall thickness of the case body 211 at the opening position 2123 is thinner, so that the case body 211 is weaker at the opening position 2123 than at the first weak position 2127 and the second weak position 2128, and the case body 211 is more likely to be ruptured at the opening position 2123, thus ensuring that, during a pressure relief process, the opening position 2123 splits from the opening position 2123 towards the first weak position 2127 and the second weak position 2128 along the first pressure relief groove 2121.

In some embodiments, the case body 211 is of a cylindrical structure, and the first pressure relief groove 2121 extends along the axial direction of the case body 211.

The case body 211 is of a cylindrical structure, in the case where a plurality of battery cells 20 are arranged side by side, it is not likely to appear that two adjacent first pressure relief grooves 2121 on the case body 211 of one battery cell 20 are shielded by another battery cell at the same time, which has a good pressure relief effect. The first pressure relief groove 2121 extends along the axial direction of the case body 211, that is, the first pressure relief groove 2121 extends along the height direction Z of the case body 211, which is beneficial to ensure the length of the first pressure relief groove 2121.

In some embodiments, the pressure relief structure 212 is disposed on the outer surface of the case body 211.

It should be noted that, in the embodiment in which the pressure relief structure 212 includes a plurality of first pressure relief grooves 2121 disposed at intervals along the circumferential direction of the case body 211, the first pressure relief grooves 2121 are disposed on the outer surface of the case body 211. In the embodiment in which the pressure relief structure 212 further includes a second pressure relief groove 2122 disposed on the case body 211, the second pressure relief groove 2122 is also disposed on the outer surface of the case body 211. In the embodiment in which the pressure relief structure 212 further includes third pressure relief grooves 2124 and fourth pressure relief grooves 2125, the third pressure relief grooves 2124 and the fourth pressure relief grooves 2125 are also disposed on the outer surface of the case body 211.

The pressure relief structure 212 being disposed on the outer surface of the case body 211 facilitates processing of each pressure relief groove in the pressure relief structure 212.

In some embodiments, the case body 211 includes a bottom wall and a peripheral wall, the peripheral wall is arranged around the edge of the bottom wall, and the pressure relief structure 212 is disposed on the peripheral wall, so as to achieve pressure relief in multiple directions.

The peripheral wall is arranged around the edge of the bottom wall, so that the case body 211 forms an opening at the end opposite to the bottom wall, and a end cover 23 is used to cover the opening.

In the embodiment in which the case body 211 is of a cylindrical structure, the peripheral wall of the case body 211 is a circular peripheral wall, and the peripheral wall of the case body 211 is a cylinder. In the embodiment in which the case body 211 is of a rectangular parallelepiped structure, the peripheral wall of the case body 211 includes four side walls parallel to the length direction thereof and connected end-to-end.

An embodiment of the present application provides a battery cell 20, comprising an electrode assembly 22 and a case 21 provided in any one of the above embodiments, the case 21 is used for accommodating the electrode assembly 22.

An embodiment of the present application provides a battery 100, comprising a box body 10 and a battery cell 20 provided in any one of the above embodiments, and the box body 10 is used for accommodating the battery cell 20.

An embodiment of the present application provides an electrical apparatus, comprising the battery 100 provided in any one of the above embodiments.

The electrical apparatus can be any of the aforementioned apparatus that use the battery 100.

Referring to FIGS. 6 and 7, an embodiment of the present application further provides a cylindrical case, including a case body 211 and a pressure relief structure 212. The case body 211 is used for accommodating the electrode assembly 22, and the pressure relief structure 212 includes: a plurality of first pressure relief grooves 2121 disposed at intervals on the case body 211 along the circumferential direction of the case body 211; a second pressure relief groove 2122, the second pressure relief groove 2122 intersects with the first pressure relief groove 2121 to form an opening position 2123, so that the case body 211 can be ruptured from the opening position 2123 along the first pressure relief groove 2121 when the pressure or temperature inside the case body 211 reaches a threshold; and third pressure relief grooves 2124 and fourth pressure relief grooves 2125, wherein each first pressure relief groove 2121 is correspondingly provided with a third pressure relief groove 2124 and a fourth pressure relief groove 2125, the third pressure relief groove 2124 and the fourth pressure relief groove 2125 are arranged at intervals along the extending direction of the first pressure relief groove 2121, the third pressure relief groove 2124 and the fourth pressure relief groove 2125 both intersect with the first pressure relief groove 2121, and the first pressure relief groove 2121, the third pressure relief groove 2124 and the fourth pressure relief groove 2125 together define an opening portion 2126. The opening portion 2126 is configured to be opened with the first pressure relief groove 2121, the third pressure relief groove 2124, and the fourth pressure relief groove 2125 as boundaries when the pressure or temperature inside the case body 211 reaches a threshold, so as to release the pressure inside the case body 211. The case of this structure has a large pressure relief area, which improves the pressure relief rate. During a pressure relief process, even if one of the first pressure relief grooves 2121 is shielded, the case body 211 can still rupture along other first pressure relief grooves 2121, so as to ensure normal pressure relief of the case body 211, reduce the risk of fire and explosion of the battery cell 20, and improve the safety of the battery cell 20.

Figure 8:
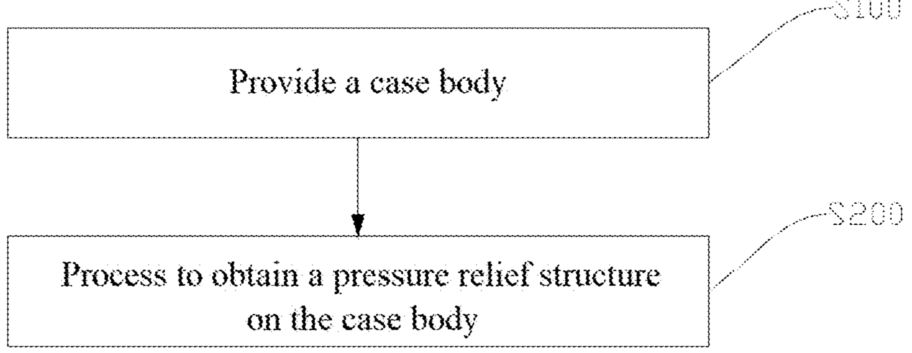
FIG. 8 is a flowchart of a manufacturing method of a case provided by some embodiments of the present application.

An embodiment of the present application provides a method for manufacturing a case 21. Please refer to FIG. 8. which is a flowchart of a method for manufacturing a case 21 provided by some embodiments of the present application. The method comprising:

S100: providing a case body 211, where the case body 211 is used for accommodating the electrode assembly 22;

S200: processing to obtain a pressure relief structure 212 on the case body 211 to form a plurality of first pressure relief grooves 2121 disposed at intervals on the case body 211 along the circumferential direction of the case body 211;

wherein the case body 211 is configured to rupture along the first pressure relief groove 2121 when the pressure or temperature inside the case body 211 reaches a threshold to release the pressure inside the case body.

It should be noted that, for the related structures of the case 21 manufactured by the manufacturing methods provided by each of the above-mentioned embodiments, reference may be made to the case 21 provided by each of the foregoing embodiments, and details will not be described herein again.

Figure 9:
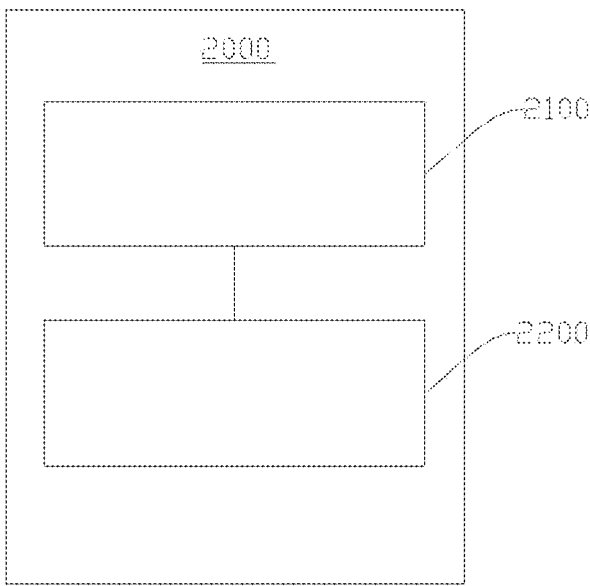
FIG. 9 is a schematic block diagram of a manufacturing apparatus for a case provided by some embodiments of the present application.

In addition, an embodiment of the present application further provides a manufacturing apparatus 2000 for a case 21. Please refer to FIG. 9, which is a schematic block diagram of a manufacturing apparatus 2000 for a case 21 provided by some embodiments of the present application, the manufacturing apparatus 2000 includes a providing apparatus 2100 and a processing apparatus 2200, the providing apparatus 2100 is used for providing a case body 211, the case body 211 is used for accommodating an electrode assembly 22, and the processing apparatus 2200 is used for processing to obtain a pressure relief structure 212 on the case body 211 to form a plurality of first pressure relief grooves 2121 disposed at intervals on the case body 211 along the circumferential direction of the case body 211.

Wherein the case body 211 is configured to rupture along the first pressure relief groove 2121 when the pressure or temperature inside the case body 211 reaches a threshold, so as to release the pressure inside the case body.

It should be noted that, for the related structures of the case 21 manufactured by the manufacturing apparatus 2000 provided in the embodiments above, reference may be made to the case 21 provided by each of the foregoing embodiments, and details will not be described herein again.

It should be noted that in case of no conflicts, the features of the embodiments in the present application may be combined with each other.

The above embodiments are merely used to illustrate the technical solutions of the present application, and are not intended to limit the present application. For those skilled in the art, the present application may have various modifications and changes. Any modifications, equivalent replacements, improvements, etc. made within the spirit and principle of the present application shall fall within the scope of protection of the present application.

What is claimed is:

1. A case, comprising:

a case body for accommodating an electrode assembly; and a pressure relief structure, comprising a plurality of first pressure relief grooves disposed at intervals on the case body along a circumferential direction of the case body, wherein the first pressure relief grooves are in linear shape and disposed substantially perpendicular to the circumferential direction;

wherein the pressure relief structure further comprises a second pressure relief groove disposed on the case body, each of the first pressure relief grooves intersects with the second pressure relief groove to form a plurality of opening positions;

wherein the pressure relief structure further comprises a plurality of third pressure relief grooves and a plurality of fourth pressure relief grooves, each of the first pressure relief grooves is correspondingly provided with a third pressure relief groove and a fourth pressure relief groove, the third pressure relief groove and the fourth pressure relief groove both intersect with the first pressure relief groove and are disposed at either side of the second pressure groove respectively;

wherein the case body is configured to rupture from an opening position along a first pressure relief groove when pressure or temperature inside the case body reaches a threshold, so as to release the pressure inside the case body.

2. The case according to claim 1, wherein the second pressure relief groove extends along the circumferential direction of the case body, and each first pressure relief groove intersects with the second pressure relief groove to form an opening position.

3. The case according to claim 2, wherein the second pressure relief groove is a closed structure extending along the circumferential direction of the case body and being connected end-to-end.

4. The case according to claim 1, wherein the second pressure relief groove comprises a plurality of groove segments disposed at intervals along the circumferential direction of the case body, and each groove segment intersects with one of the first pressure relief grooves to form an opening position.

5. The case according to claim 1, wherein an opening portion is formed on the case body at either side of a first pressure relief groove between a third pressure relief groove and a fourth pressure relief groove; and the opening portion is configured to be opened with the first pressure relief groove, the third pressure relief groove, and the fourth pressure relief groove as boundaries when the pressure or temperature inside the case body reaches a threshold, so as to release the pressure inside the case body.

6. The case according to claim 5, wherein the first pressure relief groove, the third pressure relief groove, and the fourth pressure relief groove together define two opening portions, and the two opening portions are respectively located on both sides of the first pressure relief groove.

7. The case according to claim 5, wherein the first pressure relief groove has an opening position, and the third pressure relief groove intersects with the first pressure relief groove to form a first weak position, the fourth pressure relief groove intersects with the first pressure relief groove to form a second weak position, and in the extending direction of the first pressure relief groove, the opening position is located between the first weak position and the second weak position;

the case body is configured to rupture at the first pressure relief groove from the opening position towards the first weak position and the second weak position and form a crack when the pressure or temperature inside the case body reaches a threshold, so that the opening portion is opened along the third pressure relief groove and the fourth pressure relief groove after the case body forms the crack.

8. The case according to claim 7, wherein a wall thickness of the case body at the first weak position and a wall thickness of the case body at the second weak position are both greater than a wall thickness of the case body at the opening position.

9. The case according to claim 1, wherein the case body is of a cylindrical structure, and the first pressure relief groove extends along the axial direction of the case body.

10. The case according to claim 1, wherein the pressure relief structure is disposed on the outer surface of the case body.

11. The case according to claim 1, wherein the case body comprises a bottom wall and a peripheral wall, the peripheral wall is arranged around the edge of the bottom wall, and the pressure relief structure is disposed on the peripheral wall.

12. A battery cell, comprising:

an electrode assembly; and the case according to claim 1, the case being used for accommodating the electrode assembly.

13. A battery, comprising:

the battery cell according to claim 12; and a box body for accommodating the battery cell.

14. An electrical apparatus, comprising the battery according to claim 13.

* * * * *